Feb. 9, 1943.  W. OWEN  2,310,457
MANUFACTURE OF CELLULAR BODIES
Filed Feb. 8, 1938  4 Sheets-Sheet 1

INVENTOR.
WILLIAM OWEN
BY Bradley & Bee
ATTORNEYS.

Feb. 9, 1943.   W. OWEN   2,310,457
MANUFACTURE OF CELLULAR BODIES
Filed Feb. 8, 1938   4 Sheets-Sheet 2

INVENTOR.
WILLIAM OWEN
BY Bradley & Bee
ATTORNEYS.

Feb. 9, 1943.    W. OWEN    2,310,457
MANUFACTURE OF CELLULAR BODIES
Filed Feb. 8, 1938    4 Sheets-Sheet 3

INVENTOR.
WILLIAM OWEN
BY Bradley & Bee
ATTORNEYS.

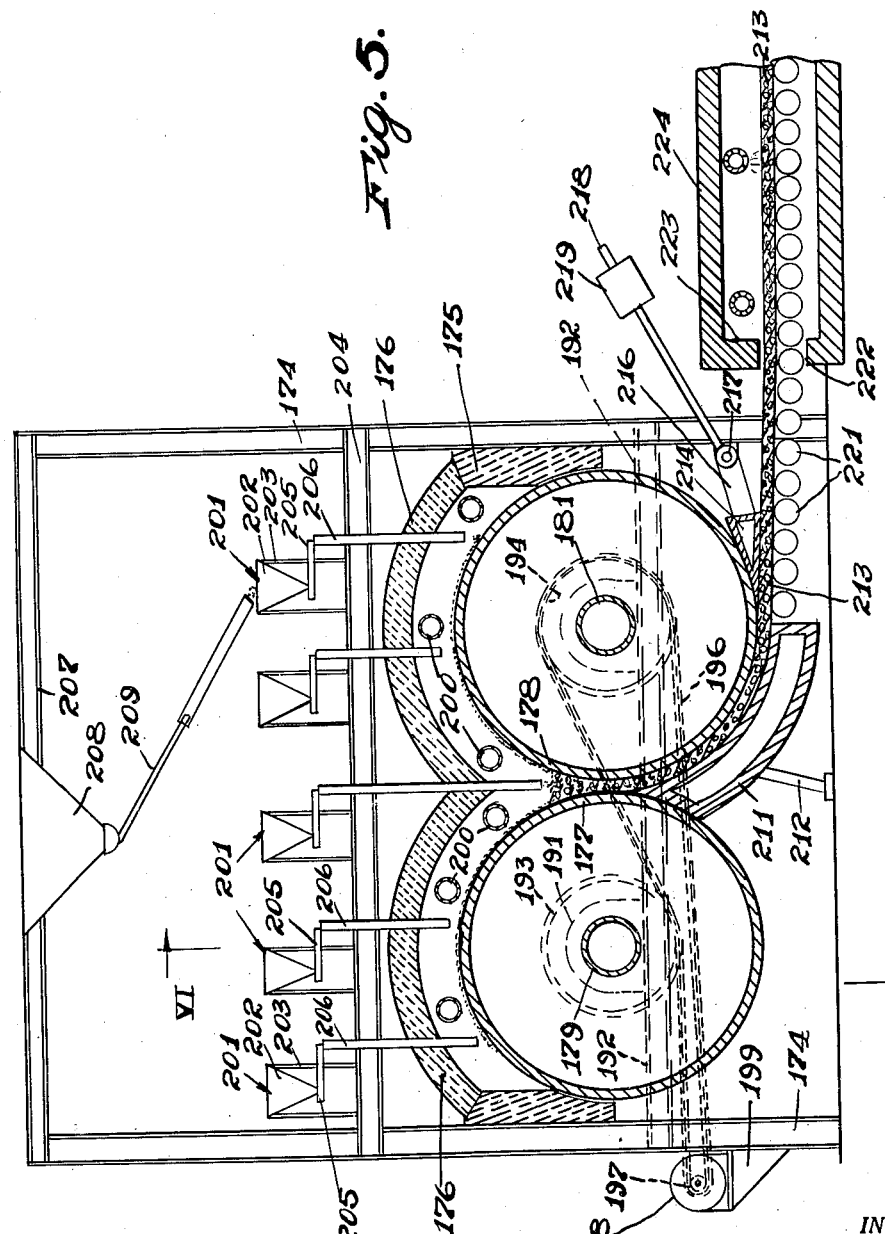

Patented Feb. 9, 1943

2,310,457

UNITED STATES PATENT OFFICE 2,310,457

MANUFACTURE OF CELLULAR BODIES

William Owen, Pittsburgh, Pa., assignor to Pittsburgh Plate Glass Company, Allegheny County, Pa., a corporation of Pennsylvania Application February 8, 1938, Serial No. 189,337

13 Claims. (Cl. 49—3)

The present invention relates to the manufacture of cellular material suitable for use as insulating media against the transmission of heat and as a light weight building material and it has particular relation to the manufacture of such materials from glass or glass-like substances such as blast furnace slag.

One object of the invention is to provide a process of preparing highly porous or cellular bodies from glass, blast furnace slag, or similar relatively refractory but thermoplastic materials which is simple, requires relatively small expenditure of labor, which is continuous in operation and which results in a product having exceptionally satisfactory properties for use as an insulating medium against the transmission of heat and as a light weight building material.

It is well known that cellular or porous materials comprising a solid or a fibrous material containing a myriad of small interstices or cells filled with partially or completely entrapped air or other gaseous medium possess high value as insulating media against the transmission of heat. Among the commoner materials which have been employed for such purposes may be included fibrous substances such as asbestos, cellulose fibers, or cellular materials such as cork and the like. None of these materials is entirely satisfactory. For example, the asbestos is fairly expensive and lacks in mechanical strength. Furthermore, it will pack down during service so that the insulating value thereof is impaired. The organic materials are lacking in resistance to heat and fire. Moreover, the resistance to acids, alkalies and other chemicals is but slight.

It has heretofore been proposed to substitute for such materials slabs or blocks of material containing numerous voids or gas cells obtained by liberation of a gas in molten or plastic glass, or similar materials. Various methods have been suggested for preparing the cellular bodies. One method involves the incorporation of carbon in the form of charcoal, into molten, or at least plastic glass. This material by reason of heat and chemical action is decomposed in the glass to liberate carbon dioxide or carbon monoxide as more or less uniformly distributed bubbles. The method is objectionable because of the difficulty of obtaining satisfactory bubble distribution. Moreover, decomposition of the gassing agent before its complete incorporation into the glass often occurred.

A second method involves subjecting relatively fluid glass to vacuum whereby to liberate and expand the entrapped or absorbed gases as innumerable small bubbles distributed through the mass. The product obtained by such method is unsatisfactory, for many purposes, because it comprises substantially continuous bodies of vitreous glass in which the bubbles are entrapped. Usually the specific gravity of such masses is high and the insulating value is comparatively low. By reason of the dense, vitreous character of the material it is also difficult to cut and shape it to suitable size and form. Furthermore, the methods as heretofore proposed are intermittent in character and require a relatively large number of individual molds which must be separately filled, thus necessitating expenditure of much time and labor.

According to the provisions of the present invention the foregoing difficulties are substantially obviated by admixing glass or glass-like material such as blast furnace slag in a relatively finely divided condition with a gassing agent designed to be decomposed at or near the softening temperature of the glass and then depositing the resultant mixture upon or in contact with a rotating drum by means of which the material is heated to a temperature sufficient to soften and sinter the particles of vitreous material together and to decompose the gassing agent, thereby expanding the sintered mass into cellular state.

For a better understanding of the invention reference may be had to the accompanying drawings in which Figure 1 is a vertical cross-sectional view of a simple embodiment of apparatus suitable for use in practicing the invention.

Figure 5 is a cross-sectional view taken upon a vertical plane of a third embodiment of apparatus which may be employed in practicing the invention.

In the drawings like numerals refer to like parts throughout.

Figure 2:
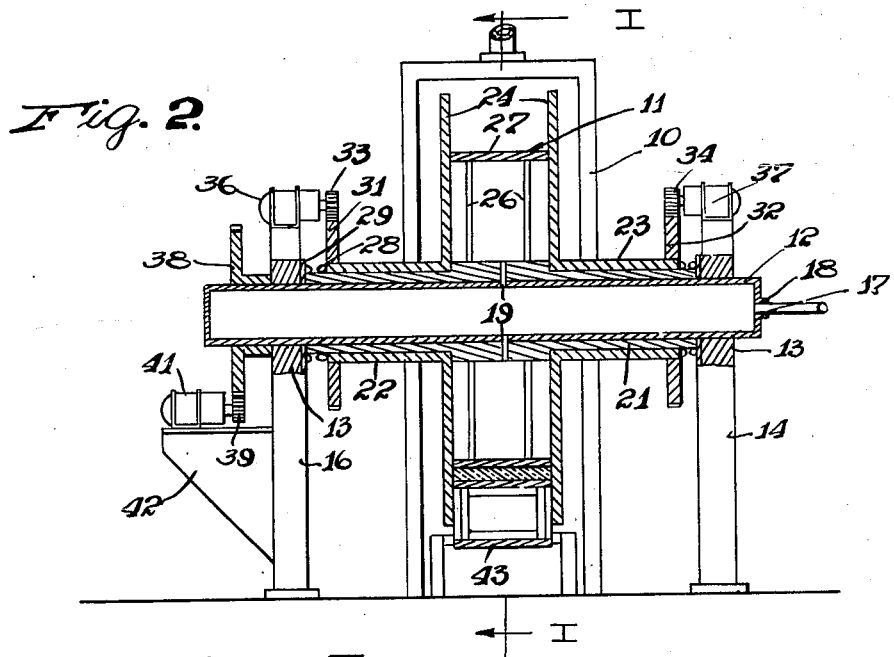
Figure 2 is a cross-sectional view taken substantially upon the line II—II of Figure 1.

In the form of the invention illustrated in Figures 1 and 2 a furnace or heating chamber 10 of convenient form is constructed of a refractory material such as fire-brick or the like. A rotating drum 11 for receiving the mixture of crushed vitreous material and gassing agent is disposed in the furnace and includes a rotating tubular shaft 12 which projects through the side walls of the furnace and is journaled in bearings 13 supported by suitable uprights 14 and 16 disposed exteriorly of the furnace. Heating fluid such as combustion gases may be admitted to the shaft by means of conduit 17 which has a swivelled connection 18 at one end of the shaft. Outlets 19 in the shaft permit the escape of the heated gases to the interior of the drum 11. The gases may escape from the drum in any convenient manner. For example, they may pass out between the edges of the cylindrical member 27 and the relatively movable disks 24. The precise manner of escape of course is not a feature of the present invention.

As best shown in Figure 2, shaft 12 is encased by a sleeve 21 and spaced sleeves 22 and 23 are disposed about the latter and projects through the sides of the furnace 10. The inner extremities of these sleeves are joined to annular disks 24 which are disposed about sleeve 21 and constitute sides for drum 11.

Radial arms 26 are connected to the sleeve 21 at or adjacent the mid portion thereof and at their outer extremities are joined to a cylinder 27 of somewhat smaller diameter than the disks 24, thereby providing a peripheral wall for the drum 11. Resilient contact is maintained between the disks 24 and the edges of the cylinder 27 by means of helical springs 28 having the extremities thereof respectively engaging the ends of sleeves 22—23 and the sides of washers 29 which are disposed about the shaft 12 and the outerfaces of which engage the adjacent ends of bearings 13.

Independent driving mechanisms for the disks 24 comprise gears 31 and 32 mounted respectively upon sleeves 22 and 23 which are driven by means of pinions 33 and 34. The pinions in turn are mounted upon the shafts of motors 36 and 37 which are disposed upon bearings 13.

Cylinder 27 constituting the peripheral wall of the drum 11 is also independently driven with respect to the disks 24 by means of mechanism including a gear 38 mounted upon one extremity of tubular shaft 12. The gear in turn is driven by means of a pinion 39 upon the shaft of motor 41 which is disposed upon a bracket 42 upon support 16.

A conveyor 43 preferably of chain form and comprising a heat-resistant material such as chrome steel is disposed below the drum 11 in position to coact with the cylinder 27 in the formation of the cellular sheet. This conveyor is trained about suitable rollers or sprockets 44 and 46, one or both of which are driven by suitable means (not shown). The working surface of the conveyor conveniently may comprise a series of slabs or bars 47 disposed in edge to edge contact upon the chains constituting a substantially continuous surface.

For purposes of preventing any tendency of the cellular mass while still soft and plastic to adhere to these bars a hopper 48 is disposed upon the rear wall 49 of the furnace chamber 10 and has a downwardly and inwardly-inclined chute 51, the lower extremity of which terminates adjacent to the upper reach of the conveyor 43. A refractory pulverulent material such as sand or similar substance is fed from the hopper and spread as a thin uniform layer upon the upper surface of the conveyor, thereby preventing direct contact between the latter and the plastic cellular material which is supported thereupon.

A mixture of crushed glass, slag or other vitreous material and a gassing agent such as crushed calcium carbonate are fed between the surface of the cylinder 27 and the upper reach of conveyor 43 by means of a vertically disposed chamber or chute 52, the lower extremity 53 of which constitutes a shoe-like member and curves involutely inwardly between the cylinder 27 and the adjacent reach of the conveyor 43.

Chute 52 is supported by means of plates 55 which are pivoted upon a shaft 56 which extends transversely of the chamber 10 in such manner as to permit a slight rotation of the plates in order to permit the lower extremity of the chute to be swung toward or away from the surface of the cylinder 27. Adjustment of the position of the chute is obtained by means of a bolt 57 which is secured at one extremity to the chute and the other extremity extends through an opening in a column 58 at the rear of the furnace 10. The bolt is held in any desired position of adjustment by means of nuts 59 and 61 threaded thereupon.

Crushed material comprising the batch is fed to the chute 52 by means of an intermediate chamber 62, the throat 63 of which connects to the upper extremity of the chute and which is closed or regulated by means of conventional mechanism such as slide valve 64. The upper throat 66 of the intermediate chamber opens into a hopper 67 and the passage between the two is also closed by means of a slide valve 68. The batch may be fed to the hopper 67 manually or by means of a suitable chute 69 which extends to a storage bin or chamber (not shown).

For purposes of externally heating the lower portion 53 of the chute 52 and the conveyor 43 suitable heating elements may be provided. In the form shown these elements comprise tubes 71 which extend transversely through the side walls of the furnace 10 and may be employed either as tuyères for the admission of combustible gases, or may be employed as radiant tubes through which heated combustion gases are fed. Any convenient electrical heating units may also be substituted for or employed in combination with these tubes. Exhaust gases are withdrawn from the furnace by means of a stack 72, leading away from the upper portion thereof.

Stripper mechanism for removing any cellular material which may tend to adhere to the cylinder 27 may be provided and in the form shown comprises a member 73 of wedge shape, which preferably is hollow for purposes of admitting cooling fluid, which is circulated through the hollow member by means of conduits 74 and 76. Member 73 is supported upon the inner extremities of arms 77 which are journaled upon brackets 78 secured to the external surface of the forward wall 79 of heating chamber 10. Arms 77 are also provided with a rearwardly projecting portion 81 on which is disposed a counterweight 82 which functions to urge the members 73 into contact with the cylinder 27. By suitable adjustment of the position of the counterweight any desired degree of pressure between the member 73 and the cylinder may be obtained.

An opening 83 is formed in the lower portion of wall 79 and the rear portion of conveyor 43 extends therethrough in proximity to a friction plate 84 which preferably is hollow and is provided with conduits 86 and 87 for the admission of cooling fluid. A sizing roller 88 also coacts with the portion of the conveyor which is external of the heating chamber 10 and functions to maintain uniform thickness of the cellular sheet as it is formed. The cellular material after passing over the plate 84 passes through an opening 89 in a rear chamber 91 and is carried by a series of rollers 92 through the latter. In its travel the sheet passes under a series of tuyère tubes 93 which function to direct flames of progressively decreasing intensity toward or against the cellular sheet as it is formed, thereby permitting the latter gradually to cool down in such manner that the internal strains therein are sufficiently relieved to provide a stable structure.

In the operation of this embodiment of the apparatus crushed vitreous material such as glass of the grade or formula employed in the formation of ordinary glass sheets, admixed with a suitable gassing agent such as calcium carbonate is supplied to the hopper 67. The crushed material for most purposes is of a fineness such that practically all thereof will pass through a screen of 28 mesh per inch, while it is practically completely retained by a screen of 100 mesh. Usually if material of either larger or smaller particle size are employed the results are not satisfactory. However, for some purposes the use of such sizes may be desirable.

The material may be fed into the hopper either cold or preheated to a temperature of, for example 1000 or 1200° F.

Calcium carbonate constitutes the most satisfactory gassing agent thus far employed, because it decomposes to liberate its chemically combined gases at a temperature of about 1500° F. This temperature is slightly above that of incipient fusing or sintering of the particles of crushed glass, but is below that at which the particles are completely fused together to form a homogenuous mass. Preferably the temperature of the sheet upon the conveyor 43 is raised to about 1600 or 1650° F. and below that of complete fusion (about 1700 or 1750° F.) of the crushed glass.

The sintered or more or less plastic mass is expanded by decomposition of the calcium carbonate to a degree which of course will depend somewhat upon the amount of calcium carbonate employed. Usually about 1 or 2 per cent of the latter are used and the optimum seems to be about 1½ per cent. Within the latter range the mass is expanded about 7 to 10 times its initial volume and the finished product will have a weight of about 14 or 15 pounds per cubic foot. The formation of masses of greater or less density by the process is of course contemplated. For example, the material may have a weight of 10 to 75 pounds or even more or less per cubic foot.

The heating of the material may be so regulated that the gassing agent decomposes at any predetermined point of contact with the drum 27. However, if decomposition occurs at or near the point of closest approach of the drum to conveyor 43, greater room for expansion of the material as it travels forward will be afforded and there will be less tendency to compress and distort the structure of the cellular mass. It is also possible so to regulate the rate of heating that the mass between the drum and the conveyor that the particles will merely sinter together at about 1400 or 1500° F. to form a coherent but unexpanded sheet. Subsequently while the sheet is upon the conveyor 43 the temperature is raised to 1600 or 1650° F. to plasticize the mass and to decompose the calcium carbonate, thereby forming the cellular sheet.

The cellular mass as it is formed is carried by the conveyor 43 under the member 73 and the sizing roll 88 which function to compress and spread it to desired thickness. In the space between the furnace or chamber 10 and the leer 91 the cellular mass cools down to such extent that it looses most of its plasticity. Preferably it is cooled approximately to 1100° F. and about which temperature annealing begins. The sheet is passed through the annealing leer and is cooled down over a period which may be as much as four or five hours in such manner that the strains therein are relieved so that the finished product is sufficiently stable for handling and use.

The sheet or strip is finally cut into blocks of suitable proportions. The finished product as previously stated is highly cellular and seems to be composed of minute particles which are sintered together at the points of contact without complete fusion into each other. Therefore, the masses comprise many uniformly distributed bubbles, the walls of which themselves probably include many small voids or air spaces which function to increase the insulating value of the material. Also, by reason of the structure, it can easily be sawed or cut and may be annealed and pierced without shattering. The masses are of excellent insulating value for heat. They are also light of weight and chemically and fire-resistant to an exceptional degree. Furthermore, they do not tend to pack down into dense masses during service.

The independent drives for the cylinder 27 and discs 24 may be employed to impart relative movement to these members, in event that the material tends to adhere thereto. By speeding up or retarding some of the parts with respect to the others the adhesions are broken.

Figure 3:
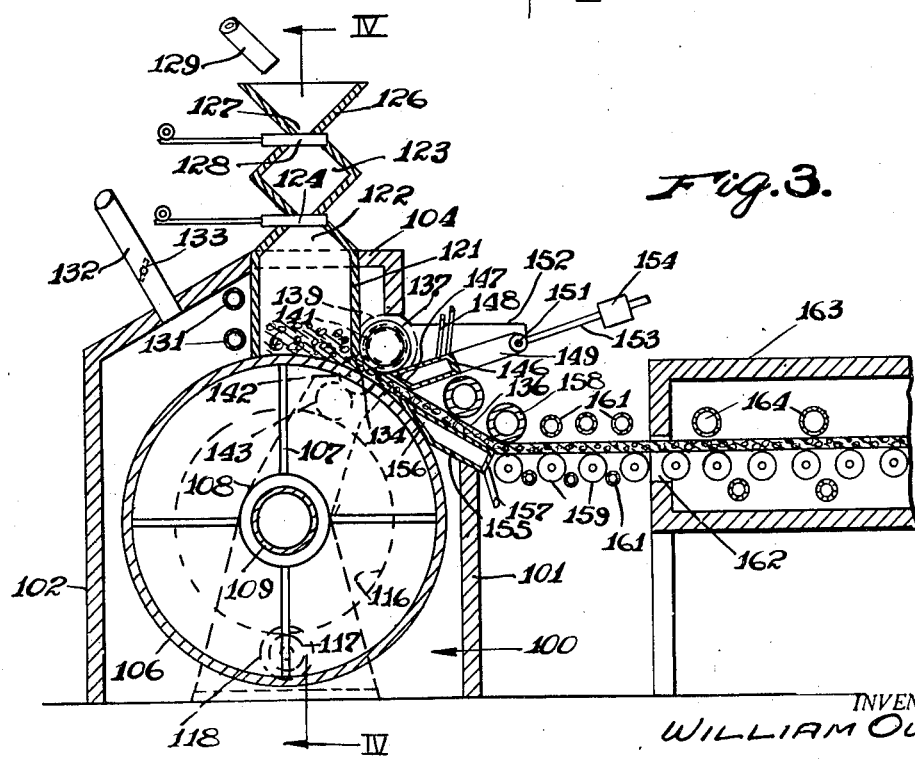
Figure 3 is a cross-sectional view taken upon a vertical plane of a second embodiment of apparatus illustrating the invention.
Figure 4:
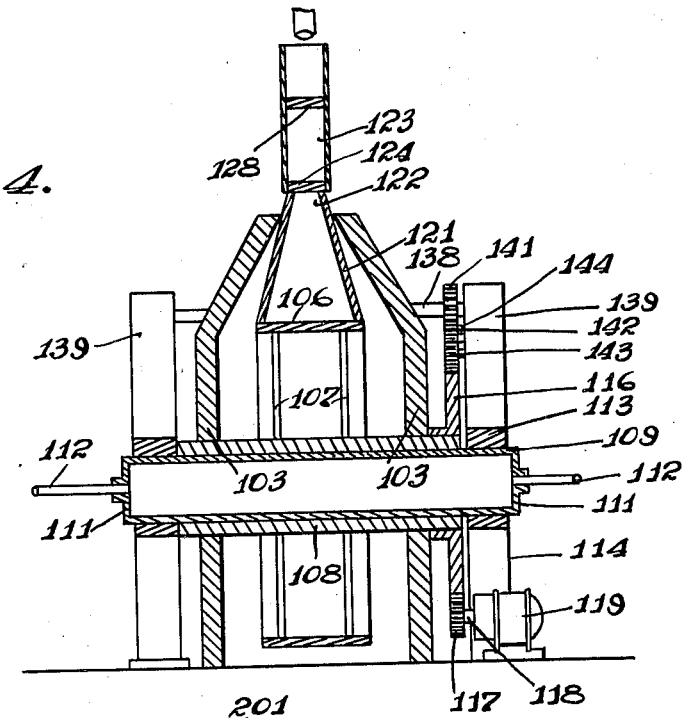
Figure 4 is a cross-sectional view taken substantially upon the line IV—IV of Figure 3.

In the form of the invention disclosed in Figures 3 and 4 a furnace or heating chamber 100 is provided, and includes front and rear walls 101, 102, side walls 103 and top wall 104.

Mechanism for forming the cellular sheet or strip includes a cylinder 106 carried by arms 107 which radiate from a sleeve 108. The sleeve in turn surrounds a tubular shaft 109 which projects through the side walls 103 of the chamber 100 and is provided with closed ends 111, the ends being provided with swivelly connected conduits 112 through which a cooling medium for the shaft is circulated. The shaft at its extremities is journaled in bearings 113 formed in uprights 114, disposed exteriorly of the chamber 100 at the sides thereof. Upon one extremity of the sleeve 108 is disposed a gear 116 which mates with a pinion 117 upon the shaft 118 of motor 119 which is mounted upon any convenient support and which constitutes a source of power for driving the drum 106.

Batch material is fed upon the drum 106 by apparatus which includes a columnar supply chamber 121, the lower extremity of which opens downwardly in proximity to the upper portion of the drum 106. Throat 122 at the upper extremity of the chamber 121 opens into an intermediate chamber 123, the passageway between the chamber 123 and throat 122 being regulated by means of a suitable slide valve 124. Intermediate chamber 123 in turn is fed by means of a hopper 126 joined thereto and the throat 127 of which is closed at will by means of slide valve 128. Crushed batch material in turn is fed to the hopper by means of a chute or conduit 129 which leads to a source of material (not shown) Heat for decomposing the gassing agent and sintering together the particles of glass or other vitreous material in the chamber 121 and upon the surface of the drum 106 is supplied from any convenient source. In the drawings are shown conduits 131 which may be employed either as tuyères or as radiant tubes through which hot combustion gases are conducted. Waste gases from the chamber 100 may be conducted away by means of flue 132 having a butterfly valve 133 constituting a damper, disposed therein.

Obviously heated gases circulate freely through the open ends of the drum and heat the latter from within.

It will be observed that the forward wall of the column 121 terminates slightly above the surface of the drum 106, thus providing a slot 134 through which the material forming the cellular sheet 136 is fed. A sizing roller 137 is disposed adjacent to the opening 134 in position to contact with and smooth out the sheet of material as it is drawn outwardly through the slot 134. The shaft 138 of this roller extends through the side walls 103 of chamber 100 and at the extremities is journaled in upwardly extending portions 139 of uprights 114. The shaft also has a gear 141 keyed thereupon and driven by a train comprising meshing gears 116, 142 and 143 journaled upon stub shafts 144 projecting inwardly from the members 139. Gear 143 in turn mates with and is driven by gear 116 already described.

Mechanism for positively stripping the cellular sheet away from the roller 137 and preliminarily chilling the upper surface thereof comprises a hollow bar 146 having a wedge-like forward edge 147 which tangentially contacts with the surface of the roller 137. Conduits 148 are also connected to member 146 and constitute means for circulating a cooling fluid therethrough. Member 146 is supported upon the free extremities of arms 149, which are secured to a shaft 151, and which in turn is journaled in bearings in brackets 152 integrally formed with or otherwise secured to the side walls of chamber 100. An arm 153 also projects rearwardly from the shaft 151 and counterweight 154 is adjustably mounted thereupon in such manner as to admit of regulation of the pressure between the member 146 and the roller 137.

The freshly formed sheet of cellular material is stripped away from the drum 106 by means of a slip plate 155 having a knife-like forward edge 156 which tangentially contacts with the surface of the drum. The slip plate is of hollow construction and is connected by means of conduits 157 with a suitable source of cooling fluid (not shown). The cellular sheet on the plate 155 is propelled forwardly at uniform rate by means of rollers 158 preferably of hollow construction for the admission of cooling fluid, the rollers being journaled in bearings and driven by motors (not shown).

The cellular sheet is carried away from the plate by means of rollers 159 and while still highly heated may be cooled by blasts of air from conduits 161, that are disposed above and below the sheet at suitable intervals, to cool the sheet down approximately to the annealing temperature, e. g., 1100° F. For purposes of annealing the sheet the conveyor system comprising rollers 159 is extended through an opening 162 in a leer 163 provided with suitable means such as burners 164 for so regulating the temperature of the leer as to obtain gradual cooling action whereby the internal strains in the sheet of cellular material are relieved.

Figure 6:
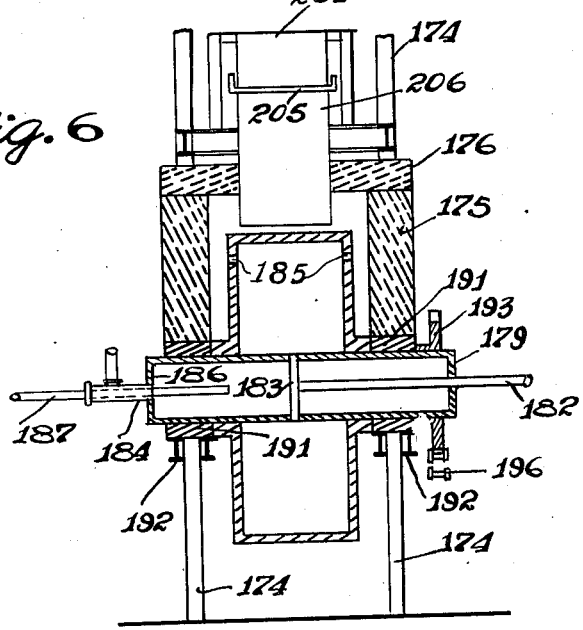
Figure 6 is a cross-sectional view taken substantially upon line VI—VI of Figure 5.

A further form of the invention as illustrated in Figures 5 and 6 comprises uprights 174 disposed at the corners of a furnace 175 having a roof consisting of twin arches 176.

Mechanism for forming the cellular sheet includes slightly spaced parallel drums 177 and 178 mounted upon hollow shafts 179 and 181 and each partially enclosed by one of the arches 176. The drums are heated by means of combustible gas mixtures supplied through conduit 182 (see Fig. 6), which extends axially of shafts 179 and 181 and are provided at their inner extremities with spider-like manifolds 183, the arms of which extend through the walls of the shafts 179 and 181. The combustion gases may be permitted to escape from the drums in any convenient manner. For example, ports or openings 185 may be formed in the sides of the latter to permit the gases to escape into the furnace where they are carried away by the stack. The shafts are also cooled by suitable means, a tube 184 leading to a suitable source of cooling fluid and being journaled in the end wall 186 of the shaft. A tube 187 of substantially less diameter than the tube 184 is nested in the latter and projects forwardly into the shafts 179 or 181 a substantial distance for the removal of fluid from the shafts.

Shafts 179 and 181 are journaled in bearings 191 supported upon cross beams 192 upon uprights 174. The shafts are also provided with sprockets 193 and 194 and a sprocket chain 196 is trained about the latter sprocket and one reach thereof contacts with the former sprocket. The sprocket chain is further trained about a driving sprocket 197 upon the shaft of a motor 198 by means of which these drums are driven in synchronism. The motor in turn is supported by bracket 199 upon upright 174.

Heat may be supplied to material disposed upon the drum by means of such devices as tuyères 200 which project through the sides of the furnace 175 in proximity to the surface of the drums.

Crushed batch material such as a mixture of relatively finely divided glass and calcium carbonate may be fed upon the drums by suitable mechanisms 201. In the drawings five of these are shown. However, any desired number may be employed. In the form of the invention illustrated these mechanisms comprise hoppers 202 mounted upon supports 203 which are carried by a cross beam 204 upon intermediate portions of uprights 174. The hoppers at their lower extremities discharge into horizontal chutes 205 which may be of so-called "syntron" type and operated by means of a suitable electrical device (not shown). The horizontal chutes in turn discharge into vertical chutes 206, which at their lower extremities terminate adjacent to the surfaces of the drums 177 and 178. One of the chutes is so disposed as to discharge directly into the bank or bight between the drums.

Uprights 174 at their upper extremities are provided with an additional set of cross beams 207 which support a hopper or storage bin 208 of relatively large proportions. This hopper at its lower extremity is provided with a swinging chute 209 which may be employed selectively to fill any of the hoppers 201 with batch material.

Batch material after passing between the drums 177 and 178 is held in contact with the latter over a substantial period of time by means of a slip shoe 211 whose center curvature as shown in the drawings coincide with that of the drum 178 or which may be so curved as to permit expansion of the material in a radial direction with respect to the axis of the drum as the gases are liberated by decomposition of gassing agent. By proper proportioning of the parts the mass may be allowed to expand with but slight restriction from the parts in contact therewith. The shoe 211 may be supported by any convenient means, for example by means of bracket 212.

The cellular sheet 213 is stripped away from drum 178 by a wedge-like bar 214 which is shown as a hollow construction for the admission of cooling fluid. The bar is supported upon arms 216, hinged at 217 to uprights 174 and further provided with rearwardly-extending portions 218, upon which are supported counterweights 219.

The cellular sheet is carried away from the forming rollers 177, 178 by means of a conveyor system comprising rollers 221 and extending through opening 222 in the forward wall 223 of leer 224 which corresponds to leer 91 or 163. In this leer the rate of cooling of the cellular sheet is so regulated as to relieve the strains therein.

The mode of operation of this embodiment of the invention closely corresponds to that already described, except that the material is deposited upon the surfaces of the conveyors in a plurality of thin films. In this embodiment of the invention the first of the vibratory feeder mechanisms may be employed to deposit a preliminary film of finely divided sand or other highly heat-resistant material upon the surface of the drums in order to prevent possible adhesion of the cellular sheet thereto. The remainder of the feeder devices may then be employed for depositing a suitable mixture of crushed glass, crushed blast furnace slag or other material upon the surfaces of the drums.

It will be apparent that the material is deposited in successive thin layers thus obviating the necessity of transmitting heat through thick masses of pulverized material. The layers readily bond together into a unitary whole. Heating of the material may be so effected that liberation of the gases to form bubbles occurs prior to passage of the material between the two rollers. However, it is also possible to operate so that the material does not expand until it has passed between the rollers and is between roller or drum 178 and shoe 211. When the apparatus is so operated, it may be of advantage to curve the shoe 211 so that the space between it and drum or roller 178 progressively increases.

The forms of the invention herein shown and described are to be considered merely as exemplary and it will be apparent to those skilled in the art that numerous modifications may be made therein without departure from the spirit of the invention or the scope of the appended claims.

What I claim is:

1. Apparatus for forming cellular sheets by sintering a mixture of crushed vitreous material and a gassing agent decomposable by heat to liberate a gas whereby to form cells in the sintered mixture, comprising a heating chamber, a rotatable drum disposed in the chamber, means for depositing a relatively uniform layer of the mixture of crushed vitreous material and gassing agent upon the drum, and means for heating the interior of the drum to bring the mixture to the sintering point of the crushed vitreous material and to decompose the gassing agent while the mixture is upon the drum, and a wedge-like stripping member disposed to contact with the surface of the drum for removing the cellular sheet therefrom.

2. Apparatus for forming cellular sheets by sintering a mixture of crushed vitreous material and a gassing agent decomposable by heat to generate a gas adapted to form cells in the sintered mixture, said apparatus comprising a heating chamber, a rotatable drum disposed horizontally in the chamber, a conveyor system extending under the drum to receive the freshly formed cellular material, a shoe curved about a portion of the drum in spaced relation thereto and extending into proximity at its lower end to the conveyor system, means for feeding a relatively uniform layer of a mixture of crushed vitreous material and a gassing agent between the drum and the curved shoe and means for heating the interior of the drum to sinter the glass while it is in contact with the drum and to decompose the gassing agent.

3. Apparatus as defined in claim 2 which further comprises a wedge-like stripping member contacting with the surface of the drum for purposes of removing the freshly formed sheet from the drum.

4. Apparatus for continuously forming a cellular sheet by sintering crushed vitreous material containing an agent decomposable by heat to form a gas, said apparatus comprising a heating chamber, a horizontal rotatable drum disposed in the chamber, said drum being disposed above and in slightly spaced relationship with respect to a chain conveyor which operates to maintain the material upon the drum in contact with the lower portion thereof, and means for continuously feeding a mixture of crushed vitreous material and a gassing agent between the drum and the conveyor and means to heat the mixture while it is in contact with the drum to sinter the glass and to decompose the gassing agent.

5. Apparatus as defined in claim 4 in which means is further provided for preliminarily depositing a thin layer of pulverulent heat-resistant material upon the conveyor to prevent adhesion of the cellular sheet thereto.

6. Apparatus as defined in claim 4 in which the means for feeding the mixture of crushed vitreous material and gassing agent comprises a shoe curved about the drum in spaced relation thereto and terminating at its lower extremity adjacent to the surface of the conveyor.

7. Apparatus as defined in claim 4 in which the means for feeding the mixture of crushed vitreous material and gassing agent comprises a supply chamber disposed approximately at one side of the drum and having one wall terminating at the surface of the drum and having the opposite wall curved about the drum in spaced relation thereto and terminating at the surface of the chain conveyor.

8. Apparatus for continuously forming a sheet of cellular material by the sintering of a mixture of a crushed vitreous material and a gassing agent comprising a heat chamber, a pair of parallel horizontal drums disposed in the chamber, means for rotating the drums in opposite directions, means for feeding a mixture of crushed vitreous material as a relatively uniform layer upon each of the drums, said drums being so disposed that as they rotate the layers upon the drums are pressed together to form a unitary sheet.

9. Apparatus as defined in claim 8 in which feeding means is provided for directly depositing additional crushed material between the bight of the drums.

10. Apparatus as defined in claim 8 in which a shoe is curved about one of the drums in spaced relation thereto for purposes of holding the material upon the drum in contact therewith after it has passed through the bight of the drums.

11. Apparatus for forming cellular material by sintering a mixture of crushed vitreous material and a gassing agent, comprising a drum consisting of a cylinder mounted upon a rotatable axle, a pair of annular discs slidably and rotatably mounted upon the axle, means urging the discs into contact with the edges of the cylinder, means for driving the cylinder and the discs independently of each other, means to supply crushed vitreous material and a gassing agent to the drum and means to heat the material upon the drum.

12. Apparatus for forming a continuous sheet of cellular glass from a mixture of crushed glass and an agent decomposable by heat to form a gas, said apparatus comprising a rotatable drum, means to feed said mixture into contact therewith, means to maintain such contact over a substantial arc of the drum, means to heat the interior of the drum to bring the material while on the drum to the sintering point of the glass and to the decomposition temperature of the agent, whereby to form a coherent cellulated sheet, and means to strip the sheet away from the drum as it is formed.

13. Apparatus for forming cellular sheets by sintering a mixture of crushed vitreous material and a gassing agent decomposable by heat to liberate a gas, whereby to form cells in the sintered mixture, comprising a heating chamber, a rotatable drum disposed in the chamber, means for depositing a layer of the mixture of vitreous material and gassing agent in contact with the drum, and means for heating the interior of the drum to bring the mixture to the sintering point of the crushed vitreous material and to decompose the gassing agent while the mixture is upon the drum, and a wedge-like stripping member disposed to contact with the surface of the drum for removing the cellular sheet therefrom.

WILLIAM OWEN.